(12) United States Patent
Jarvis et al.

(10) Patent No.: US 7,317,378 B2
(45) Date of Patent: Jan. 8, 2008

(54) PRODUCT IDENTIFICATION TAG DEVICE AND READER

(75) Inventors: Neil Jarvis, Saratoga, CA (US); Paul A. Lovoi, Saratoga, CA (US); Warren Fay, San Jose, CA (US); Christopher J. Lee, Santa Clara, CA (US); Jarie G. Bolander, Redwood City, CA (US); Bernard Baron, Mountain View, CA (US); Anthony G. Jennetti, Sunnyvale, CA (US); Forrest Wunderlich, El Granada, CA (US); Oscar Ayzenberg, Cupertino, CA (US)

(73) Assignee: Tagent Corporation, Sunnyvale, CA (US)

( * ) Notice: Subject to any disclaimer, the term of this patent is extended or adjusted under 35 U.S.C. 154(b) by 378 days.

(21) Appl. No.: 10/919,800

(22) Filed: Aug. 17, 2004

(65) Prior Publication Data

US 2006/0038658 A1 Feb. 23, 2006

(51) Int. Cl.
*H04Q 1/00* (2006.01)

(52) U.S. Cl. .................. 340/10.1; 340/572.1; 340/10.3

(58) Field of Classification Search ............. 340/10.1, 340/10.2, 10.4, 10.3, 10.34, 572.1
See application file for complete search history.

(56) References Cited

U.S. PATENT DOCUMENTS

| 3,737,911 | A | * | 6/1973 | Sakuragi et al. | ........... 340/10.4 |
| 5,479,172 | A | | 12/1995 | Smith et al. | |
| 5,724,030 | A | * | 3/1998 | Urbas et al. | ............. 340/10.34 |
| 6,480,699 | B1 | | 11/2002 | Lovoi | |
| 6,633,550 | B1 | * | 10/2003 | Gardenfors et al. | ..... 340/572.1 |
| 6,750,757 | B1 | * | 6/2004 | Gabig et al. | ................ 340/10.1 |
| 2003/0174048 | A1 | * | 9/2003 | McCorkle | ................ 340/10.34 |
| 2004/0036575 | A1 | * | 2/2004 | Patterson et al. | ........... 340/10.3 |

* cited by examiner

*Primary Examiner*—Brian Zimmerman
(74) *Attorney, Agent, or Firm*—Thomas M. Freiburger

(57) ABSTRACT

An electronic identification tag, usually in very small size, responds to a reader with an identification code unique to the object to which the tag is attached. The stand-alone device responds to a reader signal by storing energy received from the signal, then using the stored energy to generate another signal that is encoded with identification information. In operation, a reader generates RF energy which can reach a multiplicity of such tags over a distance of several meters. The system minimizes power requirements for the tag by minimizing intelligence in the IC. Use of a transmit frequency which is different from the reader's power frequency reduces interference between the power pulse and information pulse, eliminates the need for filters and enables the multiplied clock reference frequency as the transmit carrier frequency.

11 Claims, 5 Drawing Sheets

(a) single pulse (b) 3 pulses

PRODUCT IDENTIFICATION TAG DEVICE AND READER

BACKGROUND OF THE INVENTION

This invention concerns electronically readable identification tags for inventory control, automated sales, tracking shipped items, theft detection, counterfeit detection and other purposes, and more specifically the invention concerns particular embodiments of and enhancements to the ID tag device and reader system disclosed in U.S. Pat. No. 6,480,699. The invention provides for high efficiency in the receiving and storage of power in the tag device and in transmitting a signal from the tag essentially without interference from the reader signal.

A number of identification tags have previously been proposed and used to electronically control, detect and track a variety of items to which these tags are attached. These are usually in the form of a card including an antenna. When affixed to or embedded into virtually any object, the tag can individually identify the object using a unique, factory-programmed unalterable code held in a memory mounted on the card and connected to a transponder. The transponder in such a card or tag can reflect an incident signal from a reader unit in real time as described, for example, in U.S. Pat. No. 5,479,172. However, such reflective transponders in this type of identification tag require transmission of a large amount of energy from the reader, especially if the reader is to function at any practical distance, such as several meters. The reflected signal received by such a conventional reader will have a strength far smaller than the strength of the signal sent out by the reader.

U.S. Pat. No. 6,480,699, which is hereby incorporated into this disclosure by reference, describes an electronic identification tag that actually captures and stores energy received from the incident signal sent by a reader, then uses that energy to enable transmission of a responsive signal. The radio frequency (RF) signal sent by the reader, which may be referred to as a power signal, contains energy of which a portion is absorbed and temporarily stored in an energy storage device in the tag. This stored energy is then used to support circuitry in the tag and to generate a reply signal of sufficient strength as to be picked up by the reader several meters away, as well as at much shorter ranges. The reply signal is encoded by the tag device with data from a data source on the tag, primarily including an identifying code for the particular item, a code which is unique among all similar items. The antenna for receiving the power signal and also for transmitting the reply or data signal (preferably the same antenna) is directly on the integrated circuit in the '699 patent, rather than being removed from but connected to the IC. The tags can be extremely small, less than 1 mm in thickness, preferably less than 0.5 mm thick, each side preferably less than 2 mm. Such an antenna is, therefore, potentially extremely small and possesses wide application.

The IC or chip of the '699 patent therefore included the antenna, the power supply, a radio receiver, a radio transmitter, a digital logic circuit and a memory block. The preferred tag structure of the '699 patent was devoid of conventional IC parts such as bond pads, bond wires, lead frame or package terminals (such as leads of a pin grid array package or pads of a ball grid array package).

In such an electronic transponder identification tag as described in the '699 patent, power management is a challenge. The quantity of energy captured by the power supply of each of the multitude of ID tags in the system, from the power signal sent out by the reader, must be sufficient to enable a strong enough data signal to be sent out by the tag, for reception by the reader which might be several meters away. The power can be gained incrementally by the power supply of the tag, over a period of time, but this time cannot be excessive or the system of readers/tags will not work effectively for many situations. If the device is extremely small, such as to be embedded in thin items which might include paper money or other papers, the antenna is so small as to create further problems of power management, in that the antenna must both capture RF energy and transmit a sufficient signal to be received. Also, the more electronic components that must be powered on the IC of the tag, the greater the power requirement, and thus further complications in power management. For efficient power management, componentry on the chip should be kept to a minimum.

If the tag is required reliably to produce an outgoing data carrier frequency within close tolerances, this can require some power-consuming components onboard the chip, and thus it would be desirable to avoid such a requirement, and this is one issue addressed by the present invention. Further, the potential for interference between the reader signal and the tag transmission must be avoided or minimized, preferably without adding power-consuming components.

Another issue relates to storing sufficient voltage in the tag's power supply for the tag to operate. The small size of the tag and the small onboard antenna make this difficult in some circumstances, for a system which operates within FCC regulations. A minimum voltage threshold must be met for the tag to respond.

A further issue can be voltage regulation at the tag to protect transistors onboard the chip from harmful high voltages that can be induced on the antenna. Circuitry connected to the antenna should be capable of regulating the desired voltage to the power supply circuit.

Still another issue for the contemplated system is the potential for interference with other communications devices nearby. To operate the system of the invention, a minimal amount of power should be used to accomplish the desired result.

In addition to all these concerns, such a tag if manufactured in extremely small size and using a high volume semiconductor process, can encounter variations in manufacturing, shifting the center frequency from tag to tag based on the values of the inductor and capacitor on the tag. Power storage is adversely affected, as is the ability to transmit the response.

SUMMARY OF THE INVENTION

The invention described herein essentially optimizes the efficiency and performance of a very small radio frequency identification tag that has a built-in antenna directly on the integrated circuit, as described in Pat. No. 6,480,699. In the invention power management is optimized, wherein RF emanating from a reader/transmitter is absorbed by a power supply circuit in an RF ID tag generally as in U.S. Pat. No. 6,480,699. In addition, problems of RF interference are minimized, componentry onboard the integrated circuit is kept to a minimum, tag power absorption is maximized and the operating range of the RF ID system is at the same time maximized, and the chip is protected from over voltages.

In one aspect of the invention, a signal transmitter in the tag's integrated circuit, powered by energy absorbed into the power supply, transmits a data signal containing the unique product information on a radio frequency which is distinctly different from that of the reader's transmitted power signal.

This eliminates or minimizes interference between the reader (or power) signal and the data signal returned to the reader, eliminating the need for filters or other circuitry that would otherwise be required to interpret the data despite such interference.

The system minimizes power requirements for the tag by minimizing intelligence in the IC. The accuracy of the tag transmit frequency is assured in one embodiment by using a clock frequency generated by the reader, as a pulsing in the power signal, which is received in the tag and multiplied to the prescribed transmit frequency, rather than relying on onboard IC circuitry to assure the proper transmit frequency. In another embodiment the tag's frequency is generated using a 1% accuracy clock oscillator that is powered only when the tag is powered by the RF power signal.

In one preferred embodiment the power and timing reference is transmitted in the 5.8 GHz UNII band. The data signal is transmitted with a 500 MHz bandwidth somewhere within the 3.1 to 10.6 GHz UWB band. These two signals will be separated far enough apart in frequency, so as not to interfere with each other. Use of this band for the power signal allows the highest possible voltages permitted by FCC to be transmitted. The dual frequency simplifies transmit and receive filter requirements, and in one embodiment, the clock frequency on the power pulse provides a simple method for synchronization, without any significant power requirement on the chip for this purpose.

In another aspect of the invention, a method is used to obtain maximum voltage at the antenna given manufacturing process or environmental variations that inevitably will cause shifts in the resonant frequency of the antenna. Since power to run the tag is generated by charging a capacitor on the chip, essentially using it as a battery, to charge this capacitor the incoming RF pulse must be rectified into a DC voltage. By resonating the antenna, the incoming pulse can be brought to a sufficient voltage to forward bias a diode. As noted above, a problem arises when the IC is manufactured using a high volume semiconductor process where process variations can be as much as twenty percent. This shifts the center frequency of the tag's receiver based on the values of the inductor and capacitor. The invention solves this problem by varying (sweeping) the transmit frequency at the RF source, i.e. the frequency of the reader's power pulse, so that each tag, regardless of manufacturing process variations, receives a pulse that is within its optimal frequency range, thereby optimizing the performance of each tag. The invention also tunes the on-tag antenna at the time of manufacture to be within the bounds of the 5.8 GHz UNII band per the FCC. Such tuning of the tag antenna is done by measuring test structures on the wafer next to the tags. This information is then used to tune all of the tags to within the range of the 5.8 Ghz UNII band permitted by the FCC.

The varied frequency of the power pulse enables the IC device to receive maximum voltage without increasing the size or complexity of the IC. Further, it reduces the need for precision-tolerance components, thereby reducing costs of the system.

In a further aspect of the invention, voltage at the tag is maximized by reducing the duty cycle of the reader's power pulse to increase the voltage at the tag in order to raise voltage above threshold values. Since FCC Part 15 regulations allow pulsed transmitting, this allows up to a 10:1 E-field increase (and received voltage increase) provided that the average E-field value is maintained unchanged over a 1 second interval. The tag power supply has a voltage threshold $V_t$ below which it will not operate. Because of the small size of the tag, antenna open circuit voltages may be below this threshold for some situations of importance. Use of pulsed transmitting allows a reliably higher voltage to be received at the tag without exceeding FCC transmit limitations. Theoretically, increasing the E-field of the power pulse transmitted by the reader by a factor of 3:1 will triple the working distance of the tag. The pulse factor is a tradeoff between maximum voltage received at the tag and leakage on the capacitor while the pulse is not being transmitted. Presently preferred is a pulsing factor of approximately 10:1. The system of the invention thus allows sufficient voltage for the power supply to operate, increases the workable distance of the tag, and increases capability of the tag for those situations where increased voltage is required. The system also allows increased flexibility in circuit design and provides protection against interference. Further, it allows antennas smaller than 5 mm to be used in the RF ID tag environment.

In other aspects of the invention as described below, interference is reduced by adaptive optimization of reader transmitter power, based on the structure of the environment regarding other communications devices in the vicinity, and based on measured power need, to thereby reduce interference. Interference protection is provided by the reader's measuring the return signal from the tags and determining the signal strength of that signal. This information then tells the reader to turn up or turn down the power pulse.

Further, adaptive tuning (detuning) can be used at the tag antenna to regulate the voltage in the RF ID chip, primarily to protect the RF ID tag receiving circuitry from damage due to over voltages. The detuning method relies on a feedback circuit that detects the level of voltage coming out of the power supply circuit. If the voltage is approaching the limits of what the devices connected to it can handle, the feedback circuit increases the capacitance on the tuning circuit to reduce the overall Q of the circuit. The protection circuit will also dissipate some of the charge to ground if the voltage is rising too rapidly by either switching in resistance or applying more capacitance to the output of the power supply.

DESCRIPTION OF PREFERRED EMBODIMENTS

Figure 1:
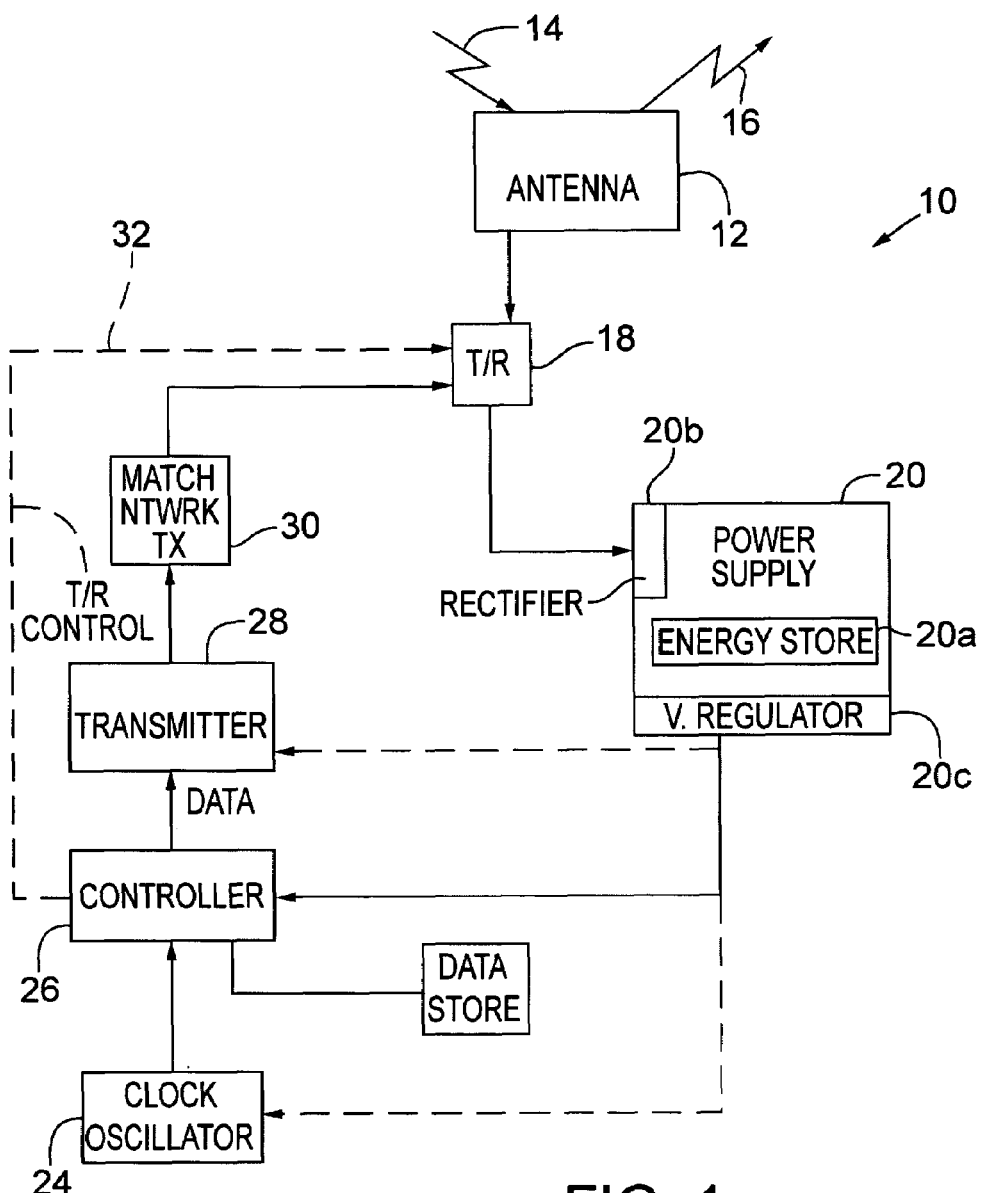
FIG. 1 is a schematic block diagram showing an RF ID tag according to one preferred embodiment of the invention.

In the drawings, FIG. 1 illustrates, in a schematic block diagram, one embodiment of a circuit 10, shown simplified, that can be included on an RF ID tag according to the invention. In this embodiment, a single antenna 12 is formed on the chip, receiving power signals 14 and transmitting reply signals 16. The antenna is connected to a transmit/receive switch 18, which could also be a diplexer, so that when in receive mode the antenna conducts power pulses to a power supply 20 that preferably is a capacitive device as described in Pat. No. 6,480,699. A portion of the RF energy from the power signal 14 is captured and builds up over a period of time by capacitive storage in the power supply 20, which includes an energy store 20a for capacitive storage, as well as a rectifier 20b to produce DC current for the energy store, and a voltage regulator 20c to control output voltage from the power supply. Disclosure of these components is contained in the '699 patent, which is incorporated herein by reference. In particular, the power supply 20 is described with reference to FIG. 3 in the '699 patent.

The power supply puts out a useful voltage for the various components on the IC 10, including a clock oscillator 24, a control circuit 26, a transmitter 28 and a transmit matching network 30. Some of this power flow is indicated in the schematic of FIG. 1, but it is understood that all components that draw power are powered from the power supply.

The clock oscillator 24 preferably is a "1%" clock, i.e. the clock will not vary by more than 1% as to frequency generated. Importantly, this clock 24 need only be energized during transmit. At all other times, the clock oscillator 24 is quiescent and not needed; its purpose is to supply a carrier frequency to be used by the control circuit 26 (which may multiply the clock frequency), enabling superimposing of transmit data on the carrier frequency. As explained in the '699 patent, a random delay preferably is used for response by each of the multiplicity of tags that might respond to a reader's power signal inquiry, and this randomized delay is generated by the control circuit, counting pulses from the clock oscillator 24.

The transmitter 28 transmits the carrier frequency and data to the antenna via the matching network 30 which matches the signal to the antenna impedance, and via the T/R switch 18, this control being shown by the dashed control line 32. The T/R 18 is switched to the transmit mode by the control circuit 26 when a responsive data signal 16 is to be sent out.

Figure 2:
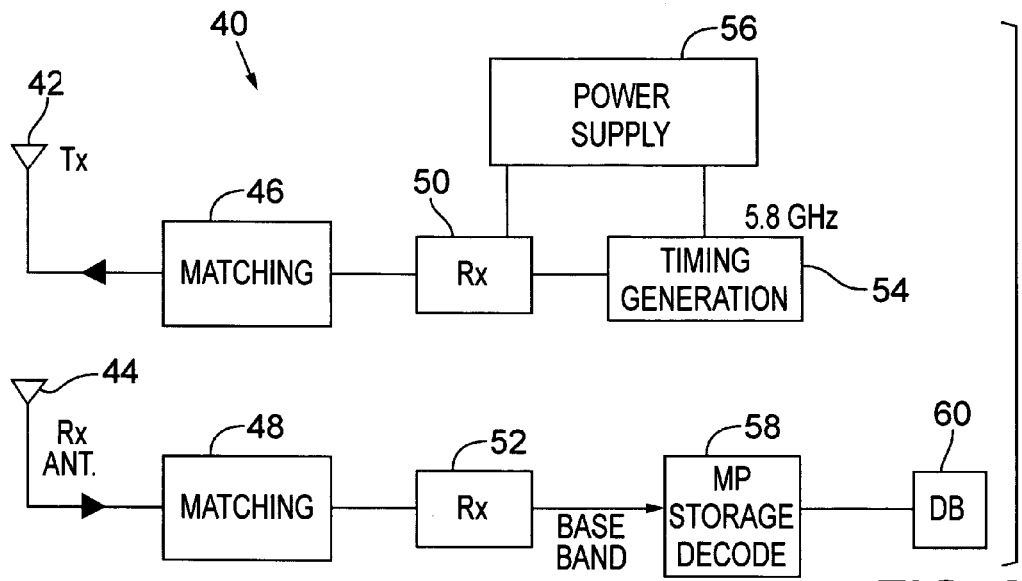
FIG. 2 is a schematic block diagram showing a preferred form of reader unit for use with a plurality of tags such as shown in FIG. 1.

FIG. 2 is a simplified schematic of reader or interrogation device 40 which is used to interrogate a multiplicity of RF ID tags 10 such as shown in FIG. 1. In the reader, two antennas 42 and 44 preferably are included, a transmit antenna and a receiving antenna respectively. As shown, each is connected to a matching network 46, 48. A transmitter 50 and a receiver 52 are shown in the drawing, connected to the respective matching networks leading to the antennas 42 and 44. In the interrogation unit or reader 40, the transmitter 50 transmits on a preselected band, which might be, for example, 5.8 GHz band. Timing generation for the carrier frequency is shown at 54. A power supply for the reader unit, which might be AC line current with appropriate conversion to low voltage DC, is shown at 56.

The simplified diagram of FIG. 2 also shows the receiving path, via 44, 48 and 52, and the signals received back from the tags preferably are carried on a different frequency, which might be in a band at about 4 GHz. As noted, these signals are fed to a microprocessor 58, where they are decoded and sent to a database 60 for use of the data received, as in inventory control, theft detection, point of sale, etc.

Figure 3:
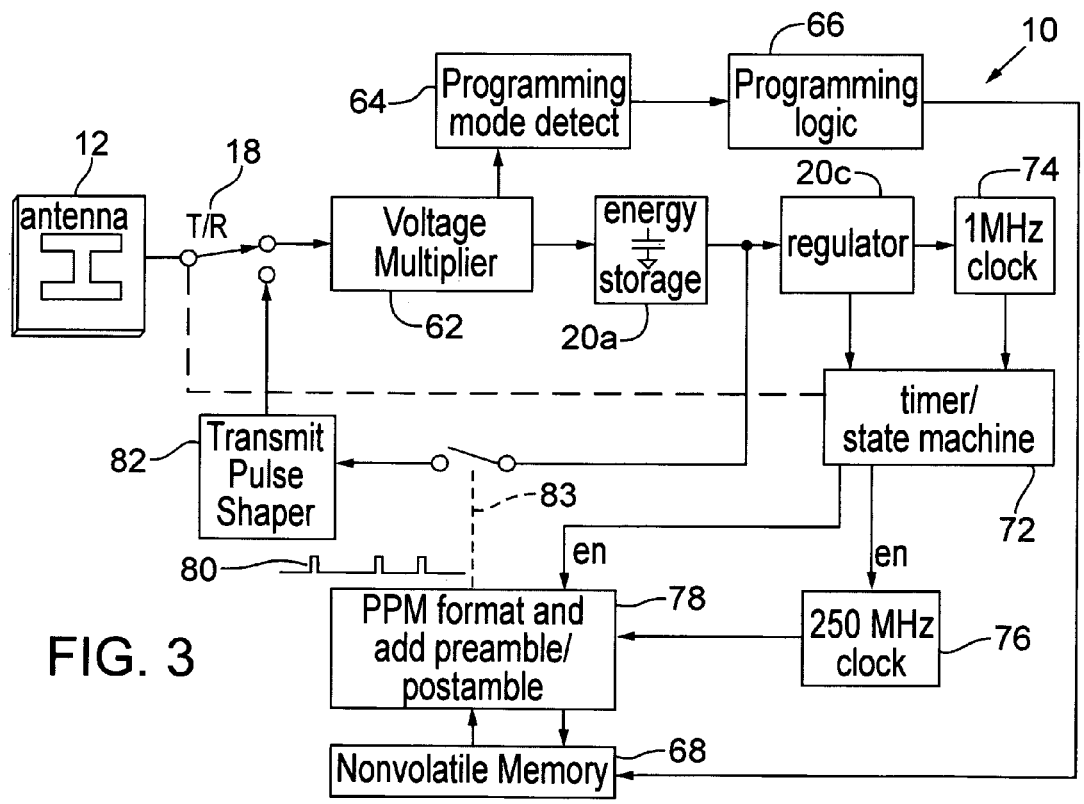
FIG. 3 is a more detailed schematic block diagram showing an example of a preferred embodiment of the RF ID tag.

FIG. 3 shows the tag circuitry in greater detail. See also FIGS. 5A and 5B of the '699 patent, disclosing structure that is applicable. Here, the antenna 12 is indicated as an H-slot antenna which is tuned to the frequency of the power pulse, which may be at the 5.8 GHz band. The T/R switch is shown at 18, a voltage multiplier at 62, and the energy storage of the power supply at 20a. The T/R switch defaults to the receive mode and is switched only for the brief periods of transmitting from the tag. When the tag is ready to transmit, the T/R switch selects the transmit pulse shaper (discussed below) as the source and the tag's data is transmitted back to the reader as explained below for a particular embodiment.

The antenna and voltage multiplier sections accumulate RF energy by rectifying the incoming power pulse. The power supply uses the rectified RF from the antenna to run a capacitor/diode multiplier for charging the energy storage capacitor, which powers the device. The energy storage capacitor is in the range of 10 to 30 nano-farads.

The block 64 indicates detection of the programming mode for the signal received on the power frequency, and programming logic is indicated at 66. The programming mode detect is effective when the non-volatile memory 68 of the tag is to be programmed. The tag is placed in a high field strength environment, higher than normal operation, and the RF power pulse applied to the tag is on/off modulated in a unique manner which is recognized by the tag. Information to be programmed into the NV memory 68 is transferred to the tag by the pattern of the on/off modulation. The programming logic 66 is encompassed within the control circuit on the tag, which is indicated at 26 in FIG. 1. This logic performs the sequence of operations needed to write the programming information provided by the programming mode detect function to the NV memory 68.

FIG. 3 shows the voltage regulator discussed above, at 20c. One function of the voltage regulator is to sense when there is sufficient voltage to run the tag. When enough energy is stored in the capacitor of the energy storage device 20a, and the capacitor voltage is sufficiently high, a signal is provided to the timer/state machine 72, which initiates the responsive transmission from the tag, indicated at 16 in FIG. 1. The voltage regulator 20a also provides a regulated voltage for the oscillator circuits and potentially other sensitive circuits during the time a transmission is active.

The drawing shows at 74 a 1 MHz clock oscillator, which provides the time base for the tag device and has a nominal frequency of 1 MHz. This provides clock timing for the timer/state machine 72. When the tag has harvested enough energy to transmit, the 1 MHz clock oscillator 74 is enabled which drives a variable length timeout. As noted above, each tag of a large group will have a different delay period or timeout to assure that transmissions from multiple tags do not interfere with each other. Note that interference avoidance among tag signals is also provided by the natural variation of the on-tag components and the tuning method described above. The tuning method will provide a normal distribution of values within the usable range.

At the end of the timeout, the state machine 72 controls the sequence of the transmission. The T/R switch 18 is placed in transmit mode, a 250 MHz clock oscillator 76 is enabled and a PPM formatter 78 in the circuit is enabled.

The 250 MHz clock oscillator 76 controls the time-base of transmission in increments of 4 nanoseconds. This oscillator is only on during the two or three microseconds of transmission because of the relatively large current required by it and by the logic it drives.

The tag data is stored in the non-volatile memory 68, along with control and calibration data. The tag ID stored in this memory will be formatted with a valid CRC, convolutionally encoded, and interleaved prior to being loaded into the NV memory. This has the advantage that less circuitry is needed in the tag to accomplish the encoding functions, and secondly, the tag architecture is then flexible to accommodate different message lengths and coding formats for different applications. The NV memory 68 will contain a minimum of 512 bits of coded information which can represent up to 256 bits of tag information. For transmission, the pulse position modulation (PPM) formatter 78 begins by transmitting a fixed pattern of pulses as a preamble, which is recognized by the reader as the start of a message. Then the PPM formatter reads information from the NV memory 68 and encodes into a sequence of precisely timed pulses (indicated at 80). In a preferred embodiment, each transmitted pulse may have one of four positions, representing two bits of coded information per pulse. This technique, called pulse position modulation, has been used extensively in optical systems and is now being used in UWB (ultra wide band) RF communications.

Once all the data have been transmitted, a post-amble is appended. This is a different pulse pattern. The reader compares the difference in time-of-arrival of the preamble and the time-of-arrival of the post-amble with the expected difference. This information is used by the reader to calibrate the tag time-base, which may vary up to 1% from tag to tag. This enables the reader to de-modulate the PPM encoded data despite the fact that tag time-base has a significant variation.

Thus, after the tag is powered up, the timer/state machine 72 directs the PPM formatter 78 to shift the ID code out of memory 68 into the pulse formatter. The pulse formatter 78 adds any pre/post-amble and formats the data. Finally, when the state machine 72 tells the formatter to send the data, a switch 81 is enabled to shift the data out into a pulse shaper 82. The switch is thus switched by the state machine. The dashed line 83 indicates control of the switch and sending data to the pulse shaper 82, which is a passive device that essentially acts as a filter. The switch brings power to the pulse shaper, which is only powered during a pulse; the act of providing power generates the pulse, at the prescribed position in this PPM sequence.

The transmission pulse shaper 82 is designed to provide a 500 MHz wide (at the 10 dB points) band-width signal in this preferred embodiment to comply with FCC requirements for ultra wide band (UWB) transmission, at a center frequency of 3.5 GHz or 4.0 GHz. This pulse can be in a gaussian shape, chosen because of its well-behaved characteristics in both time and frequency domains.

Figure 4:
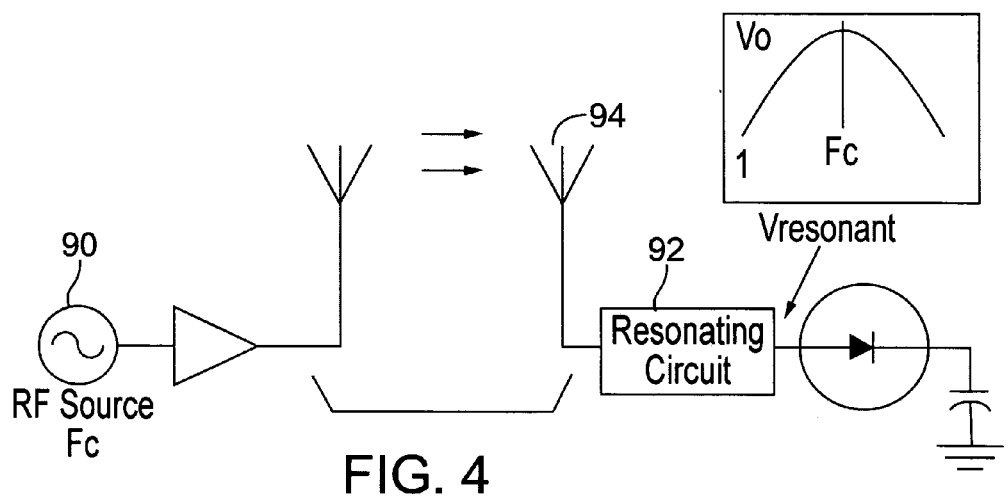
FIG. 4 is a schematic diagram indicating a feature of the invention whereby power picked up by the tag's antenna is optimized by continually varying the power signal transmitted by the reader unit.

FIG. 4 shows schematically a preferred feature of the invention whereby maximum voltage is picked up at the tag antenna despite manufacturing process or environmental variations that will cause shifts in the resonant frequency of the antenna. As discussed above, when the IC is mass produced with semiconductor processes, variations can cause a shift of the center frequency of the antenna on the tag. In this preferred form of the invention, this problem is solved by varying or sweeping the transmit frequency at the RF source 90 on the reader or interrogator, indicated schematically. The center frequency of the RF transmission from the reader is swept above and below the nominal frequency, by an appropriate factor. At the tag, the resonating circuit or matching network 92 sets the antenna to resonate at a prescribed frequency and to receive the incoming pulse in an efficient way. Because the transmit frequency from the RF source 90 at the reader sweeps in value, the tag antenna 94, even despite variations that move its optimal or center frequency, will pick up maximum power from the reader's transmitted power signal.

Figure 5:
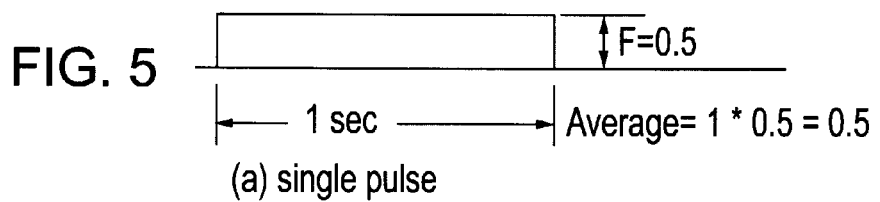
FIGS. 5 and 6 are schematic diagrams indicating a constant power signal transmission over a given period of time, versus pulsed transmission with higher peak power.
Figure 6:
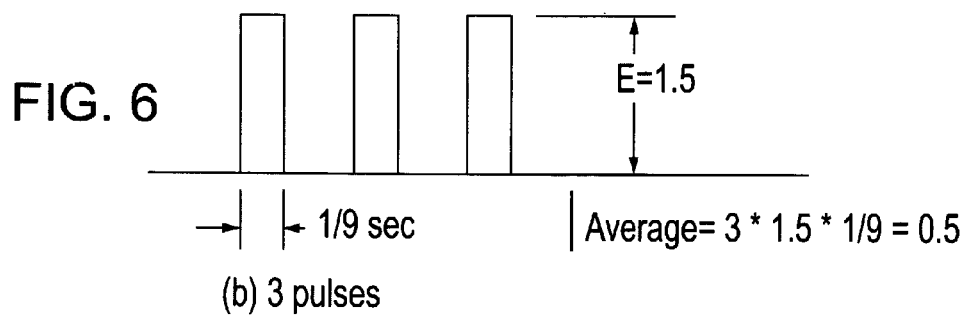

FIGS. 5 and 6 demonstrate another aspect of the invention as discussed above, whereby voltage at the tag is maximized by reducing the duty cycle of the reader's power pulse to increase voltage at the tag thus assuring voltage will be above threshold value. The drawings show, in FIG. 5, a typical situation wherein a single pulse extends over, for example, one second, with E field strength shown as 0.5. Thus, the average E field power is 0.5. FIG. 6 shows the scheme in this invention, wherein average power over one second is maintained at 0.5 in the E field, but E field strength is tripled to a nominal value of 1.5 and duty cycle is reduced such that each of the three pulses has only a duration of ⅓th second. This increase in the peak power of the E field from the interrogating RF signal assures that the threshold voltage at the tag, typically 0.5V, will be met and that power to the tag will be maximized, while not exceeding the average power of the E field and maintaining the devices within FCC regulations.

Figure 7:
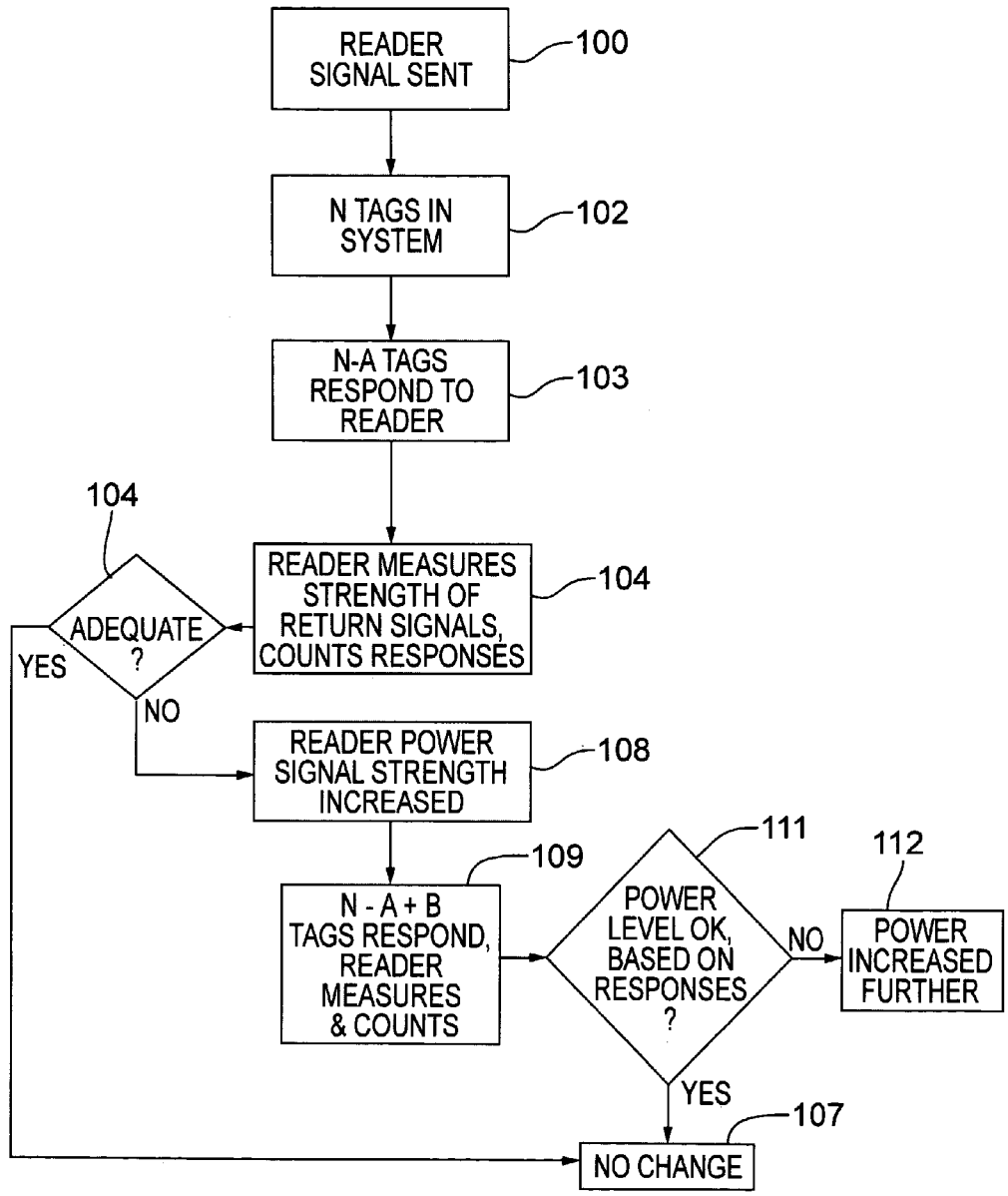
FIG. 7 is a flow-chart indicating a procedure for adaptive adjustment of power level for the power signal transmitted by the reader unit.

FIG. 7 relates to another aspect of the invention, by which interference in general is reduced by adaptive optimization of reader transmitter power, based on the structure of the environment regarding other communications devices in the vicinity. In this flow chart, a simple routine is shown for interrogating the multiplicity of tags in the system by the reader, then adjusting the reader's transmitted signal power to a minimum that will be acceptable for the application. At the block 100 the reader sends out a power signal, which, in this calibration procedure, will typically be at a low power that would cause very little or no interference with other communications devices in the area. The signal is directed to all tags, identified as N tags, as per the block 102. As indicated by the block 103, N–A tags respond to the reader, and the reader measures the strength of the return signals from the tags and counts the responses, noted in the block 104. If the number and strength of responses is adequate for the design parameters of the system within which the tags are placed, (decision block 106), then no change is required to the reader's power signal, as noted in the block 107. This assumes that for this procedure the number of tags N is known. N could be determined by the reader, if desired, by sending a very high-power signal initially, one known to reach all tags, and then starting the procedure at 100, at a low power.

If the responses are not adequate, which will usually be the case on a first iteration of this low-power calibration procedure, then the reader's control circuit increases the signal strength of the power signal from the reader, as in the block 108. The block 109 indicates that N–A+B responses are received from the tags, as measured and counted by the reader. This may or may not reach the level of N responses, and in some applications 99% or so might be enough. If the responses are adequate (decision block 111), then no change is made; however if the responses are not adequate, the power level is increased further as noted in the block 112.

A high-power calibration technique could alternatively be used. If a first signal is sent at a power high enough to reach all N tags, the reader can analyze the return signals and determine the excess power in the weakest of all tag transmissions, then adjust power accordingly, and test the result of the new power level.

Figure 8:
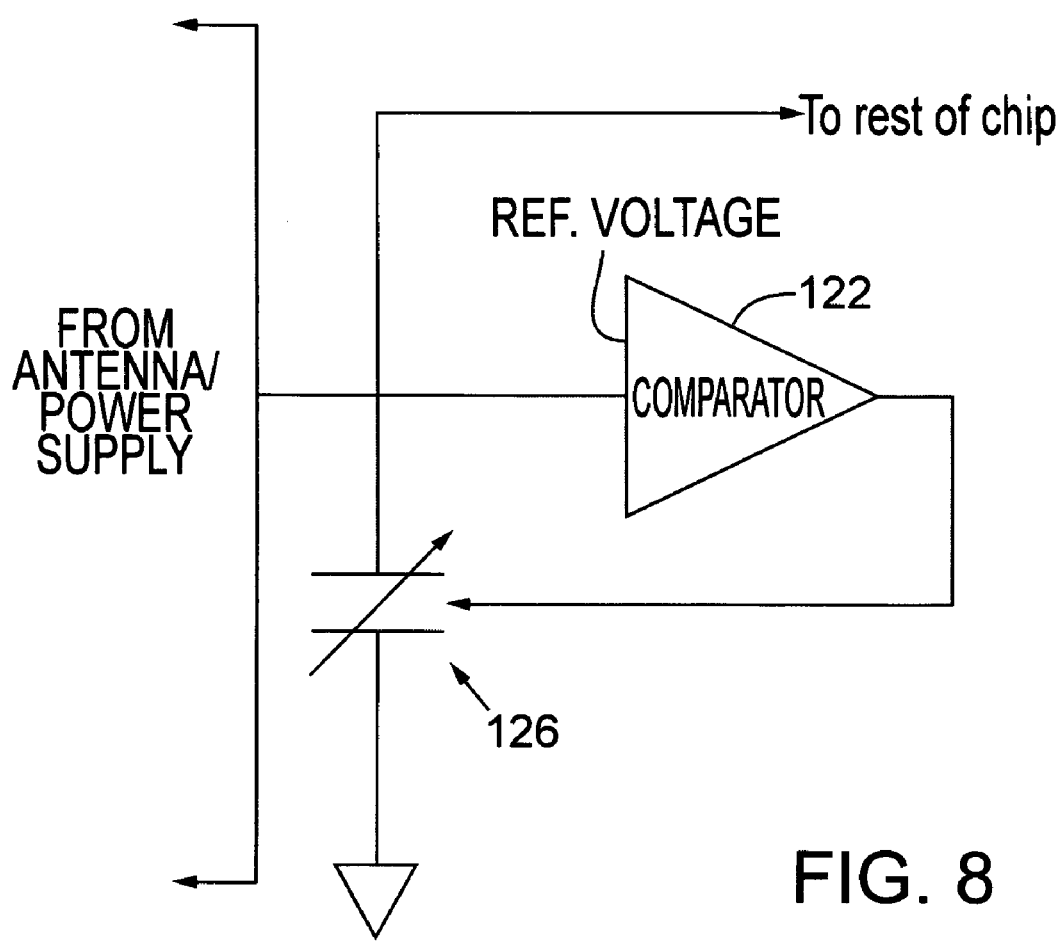
FIG. 8 is a schematic circuit diagram showing a circuit on the tag for protecting against over voltages.

FIG. 8 shows an implementation of a protective circuit for the tag, to prevent over-voltages that might damage other circuitry on the tag chip, indicated at 120. Voltage from the antenna 20 is fed to a threshold device 122, e.g. a comparator diode with a reference voltage input that is a safe limit voltage. If the preselected reference voltage limit is exceeded, the comparator device 122 affects a device 126 that is part of the power circuit: it could be part of a matching network connected to the antenna, not shown above; or it could be a component of the power supply itself, or an upstream element, the effect being to limit the maximum voltage to the main chip components. The device 126 may be a veractor capacitor. The device may partially de-tune the antenna to the point that voltage from the antenna is reduced to below the threshold.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A radio frequency (RF) communication system with a reader and a plurality of ID tags that respond to the reader by sending an identifying code back to the reader upon receiving an interrogating signal from the reader, comprising:
  a reader for interrogating all of the tags, the reader including a transmitter for transmitting an RF power signal that interrogates the tags, the power signal being on a frequency band and having a center frequency, and the transmitter of the reader having means for sweeping the center frequency of the power signal so that the center frequency varies over time back and forth between a lower frequency and a higher frequency, and the reader including a receiving circuit with a receiving antenna, for receiving a responsive data signal back from each tag interrogated with the RF power signal, and
  a plurality of RF ID tag devices within receiving range of the reader's power signal, each RF ID tag having a receiving antenna generally tuned to said center frequency of the reader's interrogating RF power signal, a power supply connected to the antenna, with an energy store capable of storing a portion of energy from the reader's RF power signal, received via the antenna, a signal transmitter connected to the power supply for sending out an RF data signal from the tag device in response to being powered by the reader's power signal, and a data source connected to the signal transmitter for generating the data signal,
  whereby variations from tag to tag in the tuning of the antenna to said center frequency of the RF power signal from the reader, due to manufacturing, environmental or other variations, are accommodated by the sweeping variation of the center frequency of the RF power signal so that at some point in the sweep of the power signal frequency, the antenna on the tag is very closely tuned to the RF power signal.

2. The radio frequency communication system of claim 1, wherein the tag device has a size no greater than about 0.5 mm thick and about 5 mm in length and width.

3. The radio frequency communication system of claim 2, wherein the tag device has a length or width dimension at least as small as 3 mm.

4. The radio frequency communication system of claim 1, wherein the antenna, the power supply, the signal transmitter and the data source are all formed in a single integrated circuit, and wherein the single integrated circuit has a free running clock that is tuned at the time of manufacture to be within the tolerance of the second frequency band in which the tag device transmits, said free running clock being used to generate the frequency for the tag's RF data signal.

5. The radio frequency communication system of claim 1, wherein the RF data signals sent out by the signal transmitter on the RFID tags are on a second frequency band different from said frequency band having a center frequency, with separation sufficient substantially to avoid interference between the RF power signal and the RF data signal.

6. The radio frequency communication system of claim 5, wherein the RF data signal is in an ultra-wide band (UWB) protocol, as said second frequency band.

7. The radio frequency communication system of claim 5, wherein the antenna, the power supply, the signal transmitter and the data source are all formed in a single integrated circuit, and wherein the single integrated circuit receives a pulse signal in the RF signal from a reader and includes an onboard pulse frequency multiplier that multiplies the received pulse signal frequency by a fixed amount to produce a prescribed data carrier frequency in said second frequency band for said data signal, thereby avoiding need for a clock frequency generator onboard the tag to assure accuracy in generating the data carrier frequency.

8. The radio frequency communication system of claim 1, wherein the antenna, the power supply, the signal transmitter and the data source are all formed in a single integrated circuit, and wherein the single integrated circuit includes a circuit for protecting the tag from over voltages, including the threshold device that determines when voltage from the antenna exceeds a preselected reference voltage, and affects the tuning of the antenna to partially de-tune the antenna whenever such reference voltage is exceeded.

9. The radio frequency communication system of claim 1, wherein the single integrated circuit has a one percent (1%) clock oscillator that is used to generate a frequency for the RF data signal.

10. The radio frequency communication system of claim 1, wherein the antenna, the power supply, the signal transmitter and the data source are all formed in a single integrated circuit, and wherein the single integrated circuit includes a nonvolatile memory which serves as the data source and which stores data unique to the particular tag, and a pulse position modulation formatting device which receives data from the nonvolatile memory and formats the data in a pulse position modulated format for transmission in the RF data signal transmitted by the tag.

11. A radio frequency (RF) communication system with a reader and a plurality of ID tags that respond to the reader by sending an identifying code back to the reader upon receiving an interrogating signal from the reader, comprising:
  a reader for interrogating all of the tags, the reader including a transmitter for transmitting an RF power signal that interrogates the tags, the power signal being on a frequency band and having a center frequency, and the transmitter of the reader transmitting the power signal in time-spaced pulses rather than continuously, the pulses having a high peak power such that average signal power over one second is much less than peak power, and the reader including a receiving circuit with a receiving antenna, for receiving a responsive data signal back from each tag interrogated with the RF power signal, and
  a plurality of RF ID tag devices within receiving range of the reader's power signal, each RF ID tag having a receiving antenna generally tuned to said center frequency of the reader's interrogating RF power signal, a power supply connected to the antenna, with an energy store capable of storing a portion of energy from the reader's RF power signal, received via the antenna, a signal transmitter connected to the power supply for sending out an RF data signal from the tag device in response to being powered by the reader's power signal, and a data source connected to the signal transmitter for generating the data signal, whereby greater power can be received and stored in the tag's power supply due to the high peak power pulses transmitted by the reader, as compared to a continuous power signal.

\* \* \* \* \*